United States Patent [19]
Soulliard et al.

[11] Patent Number: 4,602,131
[45] Date of Patent: Jul. 22, 1986

[54] TOUCH TONE DECODER

[75] Inventors: Charles Soulliard; Kevin Kelly; Philip Lehman, all of Tucson, Ariz.

[73] Assignee: Midian Electronics, Inc., Tucson, Ariz.

[21] Appl. No.: 697,464

[22] Filed: Feb. 1, 1985

[51] Int. Cl.⁴ ............................................. G06F 15/31
[52] U.S. Cl. ........................... 179/84 VF; 340/825.48; 340/825.74
[58] Field of Search ............ 179/84 VF, 2 EC, 2 EB, 179/2 A; 340/825.48, 825.74

[56]  References Cited
U.S. PATENT DOCUMENTS
4,135,150 1/1979 Quigley ...................... 179/84 VF X
4,459,434 7/1984 Benning et al. ................ 179/2 A X Primary Examiner—James L. Dwyer
Attorney, Agent, or Firm—Harold Gell

[57] ABSTRACT

A programmable tone decoder for standard bell system DTMF tone pairs is presented which comprises an integrated DTMF receiver and a means for programming a sequence of digits which are compared to the output of the DTMF receiver. The decoding means provides an output for an exact comparison of the complete sequence, the output being indicative of the reception of a proper telephone code sequence.

11 Claims, 2 Drawing Figures 4,602,131

TOUCH TONE DECODER

THE INVENTION

This invention relates to a programmable decoder for a series number sequence comprised of digits represented by the sixteen standard bell system DTMF tone pair code.

BACKGROUND OF THE INVENTION

The use of multi-tone telephone dialing has become increasingly popular and has resulted in numerous means to decode dual tones. The known systems are generally complex and of limited use since they are wired by jumpers to be responsive to a specific, distinguishable code sequence of digits.

More versatile tone decoders are available, however they generally employ sophisticated, complex circuitry which severally limits the commercial acceptance of the systems.

U.S. Pat. No. 4,275,271 on "Sub-Miniature Radio Telephone Decoder" issued to Charles Soulliard on June 23, 1981 is exemplary of preprogrammed decoders which are set for one specific telephone code or series of digits and may only be changed through rearranging jumper wires via a procedure that is not easily accomplished by a user in the field.

U.S. Pat. No. 4,354,248 on "Programmable Multi-Frequency Receiver" issued to D. Conger et al on Oct. 12, 1982 is exemplary of decoding techniques which use a programmable means to set the number sequence to be decoded. Systems of this type are generally complex and although programmable, are not readily programmed by a user in the field.

OBJECTIVES OF THE INVENTION

Therefore, it is a primary objective of the present invention to provide a programmable touch-tone decoder for a number sequence.

A further objective of the present invention is to provide a decoder for numbers represented by a series of dual tones which may be easily programmed by an operator in the field.

A further objective of the present invention is to provide a sub-miniature radio/telephone decoder capable of decoding telephone dialing codes using the DTMF touch-tone format.

A still further objective of the present invention is to provide a sub-miniature radio/telephone decoder which is inexpensive to produce, highly reliable and inexpensive to maintain.

The preceding and other objectives of the present invention will become apparent in light of the specification, drawings and claims which follow.

SUMMARY OF THE INVENTION

The sub-miniature tone decoder decodes a series of dual tones such as utilized in touch-tone telephone dialing systems and compares them with a phone number programmed into the system by a switch array. A response enabling signal is generated when the received number matches the preprogrammed number.

A standard dual tone receiver is used to decode the tone pairs and an output binary representaton of each digit is applied to a comparator which receives reference digital inputs from the switch array. The system steps through a preprogrammed telephone number in series and if all of the numbers match, a correct phone number is assumed and the incoming call is recognized by the receiver system.

When an incoming number fails to match the expected number sequence programed by the switch array, the system is reset, and lock out signalling the fact that the incoming number is incorrect and the phone call is not meant for the specific receiver.

DETAILED DESCRIPTION OF THE INVENTION

Figure 1:
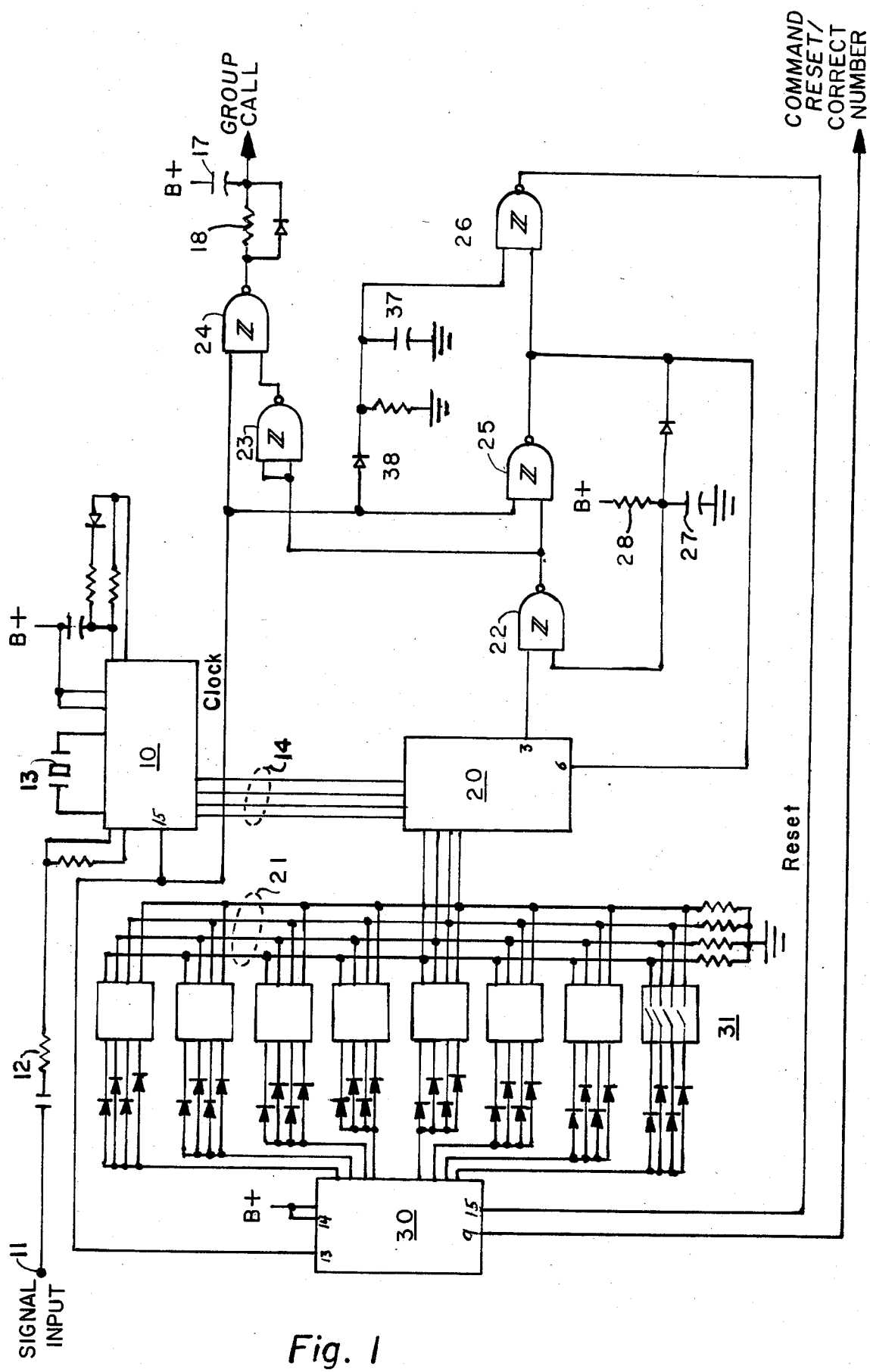
FIG. 1 is a schematic diagram of the decoder portion of a preferred embodiment of the present invention.

FIG. 1 illustrates an implementation of the decoder portion of the present invention which utilizes a Mitel MT8870 integrated DTMF receiver, 10, adapted to provide a 4-bit input word to a Motorola MC14585B 4-bit magnitude comparator, 20, which compares the 4-bit word to a reference 4-bit word supplied by a Motorola MC14017B decade counter/divider, 30, by way of a switching assembly, 31, adapted to provide 4-bit words for each output of the decade counter/divider.

NAND gate Schmidt trigger logic interprets the signals provided by the comparator and controls the decoder circuitry through logic gates that square pulse edges.

Considering FIG. 1 in more detail, an input signal in the form of a two tone transmission is applied at input jack 11 through an RC filter network 12 to the input of the integrated DTMF receiver 10. The DTMF receiver is clocked by a 3.58 Mhz crystal 13 and provides 4-bit output words representing the sixteen possible dial tone multi-frequency tone pairs and a system control clock pulse train based on its internal steering logic circuit.

Each 4-bit word representing a DTMF tone pair is applied through a bus 14 to one 4-bit input of the 4-bit magnitude comparator 20. A second 4-bit input word representing the binary equivalent of a decimal digit is received by the comparator from a switch array bus 21 which is connected to a plurality of quad switch groups 31, each of which forms a parallel 4-bit word input. Each quad switch group is comprised of four single-pole single-throw switches, such as dip switches isolated by diodes and driven by the sequentially stepped outputs of the decade counter/divider 30.

Because the quad switch assemblies are identical, only one is shown in detail in FIG. 1. The remaining quad switch assemblies are identical to the one illustrated in that they each comprise four dip switches coupled through individual isolation diodes to a common input from one of the outputs of the counter/divider 30.

In the illustrated embodiment, eight quad switch assemblies are coupled to outputs of the decade counter/divider 30 to provide an eight digit number which is sequentially generated as the counter steps through eight of its steps. The ninth count position functions as a correct number indication and the last is unused.

The DTMF receiver 10 generates a pulse train with its internal steering logic circuit that is used as a system clock that steps the counter 30 and provides synchronized gating of the logic circuits. Each system clock pulse causes the decade output of counter 30 to advance one step which sequentially energizes an associated quad switch assembly so that each switch assembly is energized in a mutually exclusive fashion. Each quad switch assembly converts its single input into a 4-bit binary word representing a specific decimal digit. In the preferred embodiment, dip switches are utilized to provide a compact system which may easily be programmed by an operator.

The counter/dip switch arrangement in FIG. 1 provides eight numbers which are sequentially applied to the comparator 20 by the 4-bit bus 21 at a frequency controlled by the speed of dialing by the caller through the steering logic of the DTMF receiver 10. After the binary number is applied to comparator 20, the binary input from receiver 10 is compared with it and if both binary numbers are equal, the output at pin 3 of comparator 20 goes high. This output is connected to one input of the two input NAND Schmidt trigger 22 which has its second input held high by a connection through a resistor to the positive side of the power supply. Thus when the input to the NAND Schmidt trigger 22 from comparator 20 goes high from its quiescent low, the normal high output of the trigger goes low. This causes the output of NAND Schmidt trigger 23 to go high and enable the output of NAND Schmidt trigger 24 to go low upon receiving a high input clock pulse from the steering logic of the DTMF receiver 10.

Figure 2:
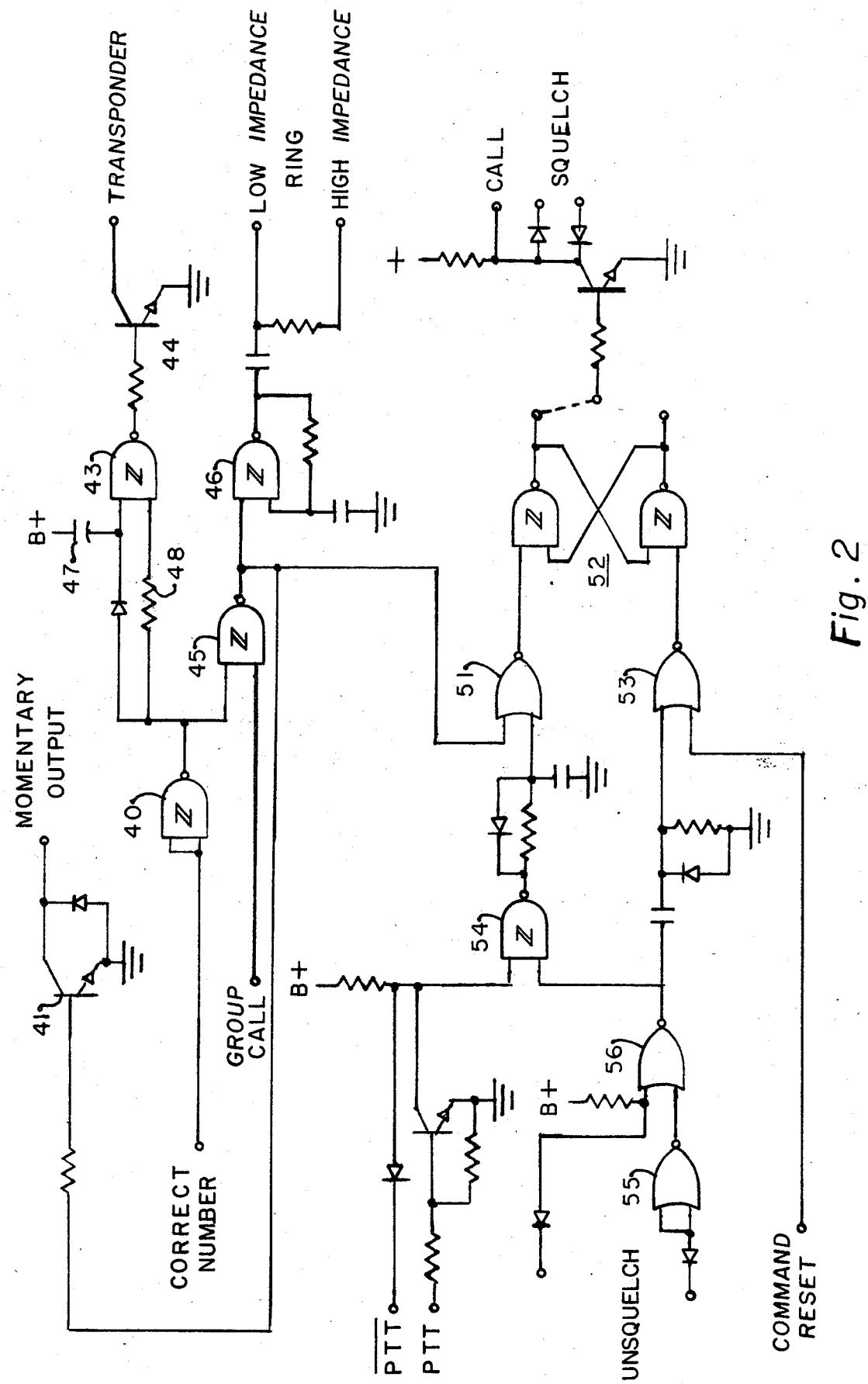
FIG. 2 is a schematic diagram of the receiver controlling circuitry responsive to the decoder circuitry of FIG. 1.

The low output from NAND Schmidt trigger 24 is applied to the correct number sensing circuitry of FIG. 2 as a group call indication.

When the output of NAND Schmidt trigger 22 went loW, it inhibited NAND Schmidt trigger 25 so that a reset pulse could not be provided by NAND Schmidt trigger 26 to reset counter 30. Thus the counter steps to the next digit in response to the DTMF decoder 10 steering logic clock and the comparison procedure is repeated but for the next digit. In the illustrated embodiment, a total of eight numbers are sequentially compared and if comparison is achieved on all eight numbers in sequence, the counter steps to the ninth output which is the correct number signal forwarded to the circuits on FIG. 2. The system can be adjusted to accommodate any number of digits within the range of outputs provided by counter 30. For example, a four digit number may be decoded by using only five of the available counter output steps or a larger number may be decoded by using a counter with more outputs. The criteria for the counter is, it must have one more output than the number of digits to be decoded.

The circuitry of FIG. 2 recognizes the correct number signal from the last counter step used and enables the ring and answer circuits. If the received digit does not compare with the digit data provided by the quad switch assembly bus 21, the output at pin 3 of comparator 20 remains low. This causes the output of NAND Schmidt trigger 22 to be high, changing the output of NAND Schmidt trigger 23 to a low value which inhibits NAND Schmidt trigger 24 so that when the high clock pulse from the DTMF receiver arrives, the signal to the call identification circuitry of FIG. 2 will remain high to inhibit that gate.

With the output of NAND Schmidt trigger 22 high, NAND Schmidt trigger 25 is enabled so that when the clock pulse from the DTMF receiver 10 arrives at it other input, the output will go low. This causes NAND Schmidt trigger 26 to send a high signal to the reset input, pin 15, of counter 30 and a fresh counting sequence begins with the quad switch assembly providing the first digit of the sequence to the decoder over the parallel bus 21. The low output from NAND Schmidt trigger 25 is also applied to pin 6 of comparator 20 where it inhibits the comparator for the duration of the clock or steering logic pulse. This also allows capacitor 27 to discharge and create a delay interval following the clock pulse during which time any further digits received will also be considered incorrect. This delay interval is regulated by the RC time constant comprised of capacitor 27 and resistor 28 and is required to hold the reset condition for the complete interdigit interval.

Thus during the time required for capacitor 27 to charge, NAND Schmidt trigger 22 is held with a high output irrespective of any input from the comparator. The RC components, 27 and 28, are selected to provide a 2.7 second delay which corresponds to the inter-digit time of 2.7 seconds that is set by resistor 38 and capacitor 37. This RC circuit holds the reset line low via NAND Schmidt trigger 26 for a 2.7 second period after the positive clock from the DTMF receiver 10.

When no signal is received by receiver 10, counter 30 is held in a reset condition so it is constantly presenting the first digit of the series to comparator 20 over bus 21. When the DTMF receiver 10 detects a valid tone pair, it creates a binary output that is applied to the comparator and after a brief delay, it steering logic output (the system clock) goes high. When the received digit and the reference digit compare, the output of the comparator goes high and due to the high status of the clock, the reset output of NAND Schmidt trigger 26 goes low and enables counter 30 to step to the next digit. The output of NAND Schmidt trigger 26 will remain low while the clock is high and for a period of 2.7 seconds thereafter as a function of the RC time constant created by capacitor 37 and resistor 38 as previously explained, just as the comparator was inhibited for 2.7 seconds after a wrong digit was received. This is the inter-digit time set for the system and if a second number is not received and properly decoded prior to this time, the system will automatically reset and remain held in the reset condition until another pulse is detected by the DTMF receiver 10.

When eight digits are successfully compared in sequence, the decade counter 30 steps to the ninth position where it is held for a period of 2.7 seconds due to the inhibit function of reset NAND Schmidt trigger 26 as previously explained. This high output from the counter is the correct number signal applied to gate 40 of FIG. 2.

When the input of NAND Schmidt trigger 40 goes high, signifying a properly decoded number sequence, its output goes low. However, the RC time constant comprised of capacitor 47 and resistor 48 delay the low input of NAND Schmidt trigger 43 by 2 seconds, thus NAND Schmidt trigger 43 maintains a low output for 2 seconds after a correct number has been decoded and then goes high to gate on transistor 44. Transistor 44 remains on for 0.7 seconds, after which the output of gate 40 returns high, switching NAND Schmidt trigger 43 and cutting off transistor 44.

The low output of NAND Schmidt trigger 40 causes NAND Schmidt trigger 45 to produce a high output in response to a correctly decoded number and enables NAND Schmidt trigger 46 to oscillate as the ring output. In a fashion similar to that used for the transpond output, the low input to NAND Schmidt trigger 45 is delayed by the RC time constant of capacitor 17 and resistor 18. Thus the ring output via NAND Schmidt trigger 45 is delayed for a digit interval to determine the reception of a group call and then maintained for a period determined by the caller.

The output of NAND Schmidt trigger 45 is applied to NOR gate 51 to set and latch squelch flip-flop 52. Once latched, the squelch flip-flop maintains the latched position until reset by a command reset input from counter 30 or the proper signal from the unsquelching circuit via NOR gate 53. The command reset from counter 30 is used as the correct number indication by NAND Schmidt trigger 40 and as the command reset digit by NOR gate 53.

The operation of squelch flip-flop 52 is also responsive to the PTT and $\overline{\text{PTT}}$ signals via NAND Schmidt trigger 54 and the unsquelching circuit comprised of NOR gates 55 and 56 which provides a means for using a high or a low signal to unsquelch the system.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A control system responsive to a predetermined number sequence, comprising:
    a data bus;
    means for supplying said number sequence in the form of logic voltage levels to said data bus;
    a reference code bus, including a plurality of individual conductors;
    means for generating a plurality of mutually exclusive, sequentially stepped outputs;
    a plurality of code setting means for establishing a reference code by each one of said code setting means selectively connecting a predetermined one of said plurality of mutually exclusive, sequentially stepped outputs to each of a plurality of individual conductors in said reference code bus;
    means for comparing voltage levels on said data bus with voltage levels on said reference code bus and providing a coincidence signal in response to a positive comparison therebetween;
    means for resetting said means for generating a plurality of mutually exclusive, sequentially stepped outputs when said coincidence signal is not generated; and
    means for providing a correct number signal when said plurality of mutually exclusive, sequentially stepped outputs successively sequence through said plurality of steps.

2. An apparatus as defined in claim 1, further comprising:
    means for providing a clock pulse train to step said means for generating a plurality of mutually exclusive, sequentially stepped outputs and enable said means for resetting.

3. An apparatus as defined in claim 2 wherein said means for providing a clock pulse train is a dual tone multi-frequency decoder.

4. An apparatus as defined in claim 3 wherein said dual tone multi-frequency decoder includes said means for supplying said number sequence in the form of logic voltage levels.

5. An apparatus as defined in claim 4 wherein said number sequence in the form of logic voltage levels is in the form of a 4-bit word.

6. An apparatus as defined in claim 5 wherein each of said code setting means includes a plurality of parallel switch means for establishing individual digit codes for said reference code.

7. An apparatus as defined in claim 6, further including means responsive to individual pulses of said clock pulse train occurring without corresponding ones of said coincidence signals for inhibiting said means for comparing for a predetermined time period.

8. An apparatus as defined in claim 7, further including means responsive to individual pulses of said clock pulse train occurring with corresponding ones of said coincidence signals for inhibiting said means for resetting for a predetermined time period.

9. An apparatus as defined in claim 8 wherein said means for comparing voltage levels on said data bus with voltage levels on said reference code bus and providing a coincidence signal in response to a positive comparison therebetween is a 4-bit magnitude comparator, including means for simultaneously comparing the value on said data bus with the value on said reference code bus.

10. An apparatus as defined in claim 9 wherein said means for generating a plurality of mutually exclusive, sequentially stepped outputs comprises a decade counter which sequentially steps through ten positions in response to said clock pulses unless reset by said means for resetting.

11. An apparatus as defined in claim 10 wherein said plurality of switch means comprises eight switch means, each connected to a different one of the first eight outputs of said decade counter.

* * * * *